D. T. CASEMENT.
Devices for Promoting Combustion in Furnaces.

No. 147,042. Patented Feb. 3, 1874.

WITNESSES:

INVENTOR:

AM. PHOTO-LITHOGRAPHIC Co. N.Y. (OSBORNE'S PROCESS)

UNITED STATES PATENT OFFICE.

DANIEL T. CASEMENT, OF PAINESVILLE, OHIO.

IMPROVEMENT IN DEVICES FOR PROMOTING COMBUSTION IN FURNACES.

Specification forming part of Letters Patent No. 147,042, dated February 3, 1874; application filed January 17, 1874.

*To all whom it may concern:*

Be it known that I, DANIEL T. CASEMENT, of Painesville, in the county of Lake and State of Ohio, have invented a new Improvement in Devices for Promoting Combustion in Furnaces, of which the following is a specification:

The present invention relates to the use of balls, blocks, or other pieces of metal in a stratum or layer above the bed of fuel for the gases to pass through as they rise from the fire and impinge upon the surfaces of the blocks, whereby they are more thoroughly mixed with the oxygen, and also more effectually consumed; and the invention consists of chains, rods, or other equivalent devices, instead of a grate, for suspending said balls or blocks, the said chains being made of Bessemer steel, platinum, or other metal capable of resisting heat, or a combination of an outer coating or plating of the same with iron or steel.

The invention is more particularly designed for the furnaces of marine or other boilers using salt or impure water, which cannot be used to protect a grate by circulating through it on account of choking up the passages with salt or other deposits.

Figure 1:
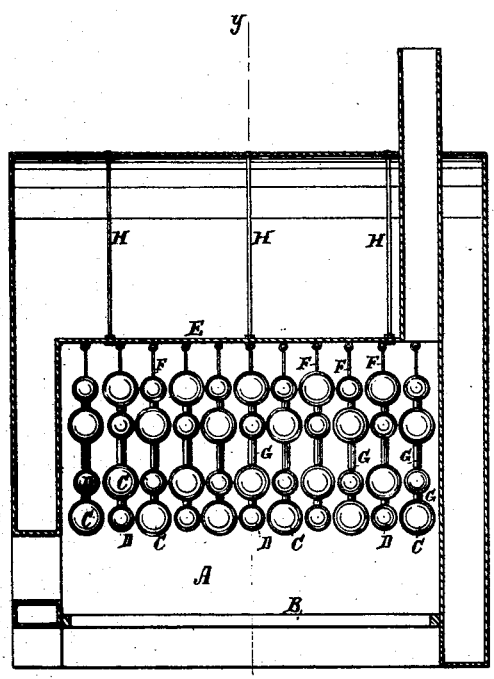
Figure 2:
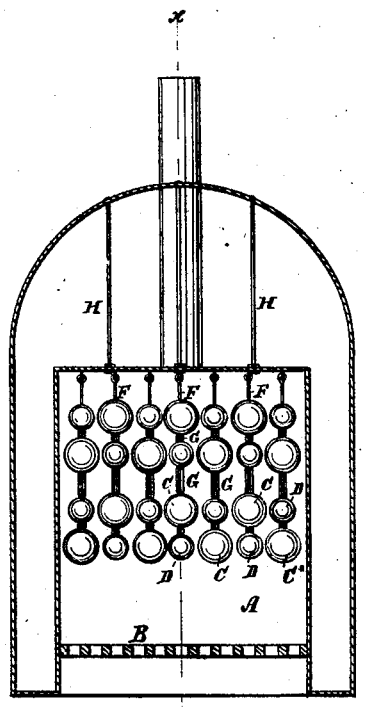
Figure 2:
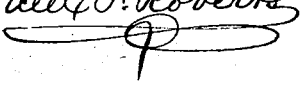
Figure 2:

Figure 1 is a longitudinal sectional elevation of a boiler-furnace, in which the balls are suspended by rods or chains, the section being taken on the line $x\ x$ of Fig. 2, which is a transverse section of Fig. 1, taken on the line $y\ y$.

Similar letters of reference indicate corresponding parts.

A represents the fire-space above the grate B. C and D represent the balls, which are suspended from the crown-sheet E by rods or chains F. G represent tubes or ferrules on the rods or chains for keeping the balls of each rod or chain more or less separate.

The balls will, by preference, be alternately large and small, as represented in the drawing, to divert the gases from direct upward courses to cause more complete contact with the balls; but they may be all of the same size, or the lower tier may be largest, and the others gradually decreasing in size from below upward. Some of the balls may be suspended from the sides of the furnace, if necessary.

The crown-sheet will, of course, be properly stayed by braces H, for supporting the weight of the balls, or the chains or rods F may extend up through the crown-sheet to the top.

A wide space for a combustion-chamber may be provided between the lower and upper tiers of balls or blocks, as represented in the drawing, if found useful for promoting combustion, as it may be.

Having thus described my invention, I claim as new and desire to secure by Letters Patent—

The balls C D, suspended from the crown-sheet or the top of the boiler, or partly from the former and partly from the latter, by metal rods or chains F, substantially as specified.

DAN. T. CASEMENT.

Witnesses:
T. B. MOSHER,
ALEX. F. ROBERTS.